Patented Dec. 25, 1951

2,580,230

UNITED STATES PATENT OFFICE 2,580,230

IMPROVED POLYVINYL ACETATE EMULSION CAPABLE OF DEPOSITING WATER-RESISTANT FILMS AND BONDS

Walter G. Kunze and Raymond Bertram Evans, Catonsville, Md., assignors to Le Page's Inc., Gloucester, Mass., a corporation of Massachusetts No Drawing. Application March 24, 1950,
Serial No. 151,812

6 Claims. (Cl. 260—29.6)

This invention relates to emulsions of polymers which are suitable for use as coatings and as adhesives. It is particularly concerned with such an emulsion of polymers which is capable of providing a water-resistant bond or coating and which at the same time retains the stability, fluidity and the various other physical properties of such an emulsion which make it particularly useful as a coating or adhesive.

The use of melts and solutions of water insoluble artificial resins in the coating and adhesive art has been supplanted to a large extent by emulsions of such resins, particularly polyvinyl acetate emulsions, due to the improved ease, economy and safety with which aqueous emulsions of the resin may be employed. On the other hand, the usefulness of water insoluble polymer emulsions has been limited by the characteristic lack of water-resistance of the coatings and bonds deposited therefrom at room temperature and the tendency of such coatings and bonds to re-emulsify or disintegrate when subsequently brought into contact with water during the course of normal use of the object or article to which they have been applied.

This lack of water-resistance has been considered innate in the coatings and films deposited from such polymer emulsions inasmuch as water-soluble emulsifying and bodying agents are employed necessarily to establish and stabilize the emulsion. These agents are apparently carried into the film or bond deposited from the emulsion upon application of the emulsion to a surface, and actively exhibit the emulsifying effect on the polymer comprising the body of the coating or film and cause its redispersion when the surface is brought into contact with water.

Various proposals have been made to obviate the water-sensitivity of the coatings or bonds deposited from such emulsions, but in general these proposals have been directed to modifying emulsions of such polymers which have been prepared in a specific manner, or require treating the emulsion with certain diluents immediately prior to its application due to the recognized tendency of the suggested diluents to either break or gel the emulsion shortly after the addition of the diluent.

Prior to the instant invention, for example, a common expedient for increasing the water-resistance of a coating or film deposited from a water-insoluble polymer emulsion included the addition of a quantity of one or more substances such as dimethylol urea, trimethylol melamine, certain chromium salts, strong acids or highly reactive aldehydes such as glyoxal, certain resins, toluene and peroxides. In most instances it was required that the substances be added to the polymer emulsion immediately prior to use as the resulting compositions were unstable and certain of the substances resulted in a progressive increase in the viscosity of the emulsion until a gel was formed. Gelling rendered the composition unfit for use in adhesive applicator machines operated at high speed. Additionally, the modification effected by some of these substances did not result in a substantial improvement in the water-resistance of the coating or film deposited from the emulsion, and often imparted undesirable color and foaming characteristics to the emulsion.

Where thermo-plastic polymeric material has been employed it has been suggested that the water-resistance of the coating or bond deposited from an emulsion of the material can be improved by heating the coating or bond sufficiently to cause coalescence of the material into a homogeneous mass. This procedure is obviously not suitable where the emulsion is employed as a quick-setting adhesive in high-speed mechanical applicators, and in any event the drying and heating suggested is often impractical.

A further suggestion directed to retaining the advantages of working with the polymers in an aqueous medium and at the same time avoiding the inherent disadvantages of water-sensitivity of the coatings or films deposited therefrom required dispersing the polymer as extremely small particles. The coatings or films deposited from such emulsions do exhibit a satisfactory water-resistance, but due to the fine particle size which imparts the water-resistance, the emulsions do not have the tack necessary to make them useful as quick-setting adhesives.

It is an object of this invention to provide a composition comprising an aqueous emulsion of a polymer, particularly a polymer of vinyl acetate, alone or in combination with small quantities of other monomers, which is stable throughout long periods of storage and which when employed as a coating or as an adhesive will deposit a coating or bond which is highly water-resistant. A further object of the invention is to provide a process which is generally applicable to modify emulsions of polymers, particularly polyvinyl acetate, which have been polymerized to different extents, or in different manners, and which include various combinations of plasticizers and other diluents commonly employed to develop favored characteristics in the films or coatings deposited from such emulsions.

We have discovered that the water-resistance of coatings or bonds deposited from an aqueous emulsion of polymers, particularly polyvinyl acetate emulsions, which are formulated, or modified, to have a tackiness rendering them suitable for use as quick-setting adhesives, can be established by additions of the clay bentonite, or sodium montmorillonite, within specific limits. Other clays, such as those commonly employed as fillers or extenders in the preparation of adhesives and the like, or in the preparation of molded products formed therefrom, were also examined, but did not effect waterproofness of the films and bonds deposited from polyvinyl acetate emulsions. For example, calcium montmorillonite, commonly known as "fuller's earth," has, with the exception of the metal radical, the same chemical constitution as bentonite, but nevertheless, fuller's earth is not active in producing water-resistance in the films and bonds deposited from a polyvinyl acetate emulsion.

In formulating an emulsion capable of depositing waterproof films and bonds according to the invention, the bentonite clay is made up as a paste by mixing the bentonite with water, and this paste is added to the emulsion in small quantities while the starting material emulsion is continuously stirred. If the emulsion is added to the bentonite paste, the water phase of the emulsion is taken up by the bentonite and this results in giving the mixture a very high body.

The preferred range of quantities of bentonite by weight with respect to the solid content of the polyvinyl acetate emulsion has been found to be between about ½ and 25 percent, the optimum amount in a particular instance depending upon the initial water-resistance characteristics of the starting material emulsion, the amount of plasticizers employed, and the age of the starting material emulsion employed in formulating the composition.

The physical properties of a polyvinyl acetate emulsion such as the viscosity of the emulsion, and the tensile strength, flexibility and heat sealing temperature of the film or bond deposited from the emulsion are determined in a large part by the degree of polymerization of the vinyl acetate monomer. A higher degree of polymerization results in increased bond strength, a higher heat sealing temperature and a somewhat higher initial water-resistance, which is, however, considerably less than required commercially for a water-resistant coating or bond. A lesser quantity of the active compounds is necessary to impart the desired water-resistance to the deposited coatings or bonds when the relatively greater water-resistant emulsions are employed as a starting material.

For present purposes any polyvinyl acetate starting material emulsions having sufficient tack to be useful as a quick-setting adhesive is suitable for improvement according to the instant invention. Such emulsions generally contain about 50-60% polyvinyl acetate by weight, and include the commercially available polyvinyl acetate emulsions known as Elvacet 80—900, Elvacet 81—900, Polyco 289, Polyco 117-H, Polyco 117-SS and Gelva S-55. The starting material emulsion may, however, contain anywhere from 40-70% solids depending on the special characteristics desired. The water-resistant adhesive here described may be mixed with other adhesive bases such as starch adhesives, polyvinyl alcohol adhesives and others, in which case the waterproofness of the finished composition will be increased but, of course, the solid content of polyvinyl acetate with respect to the finished composition will be considerably less than the 40-60% specified above.

The physical characteristics of the commercially available polyvinyl acetate emulsions identified above may also vary to some extent as a result of the emulsifiers and bodying agents employed in producing the emulsions, and also as a result of particular plasticizers employed. In general, however, the variations which tend to increase the relative initial water-resistance of the starting material emulsions lessen the quantity of the bentonite required to effect complete water-resistance.

It should be noted, however, that in each instance the emulsion containing the plasticizers and various other diluents was not initially water-resistant and that the addition of the bentonite is necessary to effect any water-resistance whatsoever, although as related above, a lesser amount may be necessary in some instances.

Insoluble plasticizers which may be used include dimethyl phthalate, dibutyl phthalate, chlorinated diphenyls, methyl abietate, tributyl phosphate and di-carbitol phthalate, dibutoxy-glycol phthalate, dimethoxy-glycol phthalate, butyl phthalyl butyl glycolate, methyl phthalyl ethyl glycolate, triglycol di-2-ethylbutyrate, triglycol di-2-ethylhexoate, tricresyl phosphate and triphenyl phosphate.

The presence of certain water-soluble thickeners such as polyvinyl alcohol and sodium carboxymethyl cellulose tend to increase the amount of bentonite necessary to effect maximum water-resistance.

Aging the starting material emulsion or the composition tends to increase the water-resistance of the coatings or films deposited therefrom.

It will be apparent from the foregoing that innumerable possibilities for formulating the instant water-resistance composition exist, and that the invention may be practiced to increase the water-resistance of any particular polyvinyl acetate emulsion without materially interfering with the versatility of the starting material emulsion. It will be noted, however, that the bentonite is effective in producing water-resistance when used in quantities within the range of ½-25% by weight of the solids present in the starting material polyvinyl acetate emulsion. In most instances, however, the maximum water-resistance is obtained with the least effect on other physical characteristics of the composition when a total of from ½-10% of bentonite by weight of solids in the starting material emulsion is employed.

Bonds deposited from emulsions containing more than about 25% of bentonite with respect to the solid content of the emulsion do not have sufficient adhesiveness and will not cause the bonded paper to tear when the bonded papers are separated.

Films deposited from emulsions containing

40% or more of bentonite can be scraped off the paper on which they have been deposited. Emulsions which contain 30% bentonite by weight of solid content of the emulsion deposit films which, though insoluble, disintegrate when rubbed after wetting-out. Films deposited from emulsions containing more than 30% bentonite are not waterproof.

It will be understood that the films and bonds deposited from emulsions of the type treated herein have the same composition as the emulsion from which the films and bonds are deposited except for the water phase of the emulsion.

In all of the following examples the composition was prepared by stirring the starting material emulsion with a high speed mixer continuously during the addition of the bentonite thereto. The active compound was introduced into the emulsion at the rate of about 3% of the total weight of the active compound per minute.

Each of a number of the tacky starting material polyvinyl emulsions was applied as a coating on the surface of a moderately calendered and sized white sulphite paper and as a bond between two such papers. The films and bonds thus formed were allowed to dry for 24 hours at room temperature and were thereafter immersed in water at room temperature for 24 hours. Upon removal from the water the wet strength of the paper exceeded the bond strength in all cases, and the bond ruptured when the bonded papers were separated. The coatings in each instance had visibly disintegrated. These starting material emulsions were, therefore, considered non-water-resistant, and in the subsequent experiments, satisfactory water-resistance of a film or bond formed from an emulsion treated with bentonite was considered fully indicated when the strength of the bond exceeded the wet strength of the paper after 24 hours immersion.

Example 1

.3 gram of bentonite was mixed with about 4 cc. of water and stirred to form a paste. This paste was added slowly to 110 grams of a polyvinyl acetate emulsion having about 55% solid content while the emulsion was stirred continuously with a high speed mixer. Three additional samples were made in the same way using the same amount of bentonite and starting material emulsions taken from three different commercial sources. The bonds deposited from these four samples were tested for waterproofness by applying the sample as a bond between two mildly calendered and sized white sulphite papers. The bonds thus formed were allowed to dry for 24 hours. The bonded papers were thereafter immersed in water at room temperature for 24 hours. At the end of this period the bond strength exceeded the wet strength of the paper and remained intact when the bonded papers were separated.

Example 2

A first set of six samples was prepared by adding, respectively, 1.5 grams, 3 grams, 5 grams, 10 grams, 15 grams and 18 grams of bentonite to 110 grams of a tacky polyvinyl acetate emulsion having about 55% solid content. The bentonite was first made into a paste by mixing the bentonite in water and the paste thereafter added slowly to the starting material emulsion while the emulsion was being stirred constantly. The films and bonds deposited from these samples were tested for waterproofness in the manner described in Example 1. All were found to be waterproof and to have good adhesive properties when dry with the exception of the sample containing 18 grams of bentonite. The bond produced by the sample containing the 18 grams of bentonite did not tear the bonded papers when they were pulled apart.

Example 3

A sample was prepared by mixing 1.2 grams of bentonite with a small amount of water to form a paste. This paste was added slowly to 110 grams of a polyvinyl acetate emulsion having about 55% solid content while the emulsion was stirred continuously. Six grams of a dimethyl phthalate plasticizer were added and the stirring continued until a homogeneous mass was obtained. This sample was tested for waterproofness in the manner described in Example 1 and the films and bonds deposited therefrom were found to be water-resistant and to have good adhesive properties when dry.

Example 4

Two samples were prepared in the manner described in Example 3 using the same materials and amounts except that in the first sample a chlorinated diphenyl plasticizer was used in place of the dimethyl phthalate, and in the second sample a dibutyl phthalate plasticizer was used in place of the dimethyl phthalate plasticizer. Both samples were tested for waterproofness in the manner described in Example 1, and the films and bonds deposited from the samples were found to be waterproof.

It will be apparent that the water-resistant compositions formulated according to the instant invention will considerably extend the usefulness of aqueous emulsions of polyvinyl acetate into the field in which high water-resistance of the bond or coating deposited is necessary, and will find application in bonding or cementing for cellulosic articles such as paper cups which in the course of normal use are exposed to water, and for bonding surfaces of cellulosic material to other surfaces of a hydrophilic character such as masonry. These instant compositions are particularly adapted for use as a sizing where water-resistance of the fabric or the paper to which it is applied is required. It may also be employed in the composition of printing paste, as a finish for paper, paper-board, or foils and in the manufacture of formed or impregnated goods, as well as for a sizing or a paint base.

Having thus described the invention, what is new and desired to be secured by Letters Patent is:

1. A composition comprising a tacky aqueous emulsion of polyvinyl acetate, and from ½ to 25% by weight of said acetate of bentonite.

2. A composition comprising polyvinyl acetate and from ½ to 25% by weight of said acetate of bentonite.

3. A composition comprising a tacky aqueous emulsion of polyvinyl acetate having from 40–60% solid content, a plasticizer for said acetate, and from ½ to 25% by weight of said acetate of bentonite.

4. A composition comprising polyvinyl acetate, a plasticizer for said acetate, and from ½ to 25% by weight of said acetate of bentonite.

5. A composition comprising a tacky aqueous emulsion of polyvinyl acetate having about 55% solid content, a plasticizer for said acetate, and from ½ to 25% by weight of said acetate of bentonite.

6. A composition comprising a tacky aqueous emulsion of polyvinyl acetate and from ½ to 10% by weight of said acetate of bentonite.

WALTER G. KUNZE.
RAYMOND BERTRAM EVANS.

REFERENCES CITED

The following references are of record in the file of this patent:

UNITED STATES PATENTS

| Number | Name | Date |
|---|---|---|
| 2,217,119 | Kerr | Oct. 8, 1940 |

FOREIGN PATENTS

| Number | Country | Date |
|---|---|---|
| 569,591 | Great Britain | May 31, 1945 |
| 575,284 | Great Britain | Feb. 8, 1946 |
| 890,326 | France | Nov. 2, 1943 |